US012080215B2

(12) United States Patent
Wen

(10) Patent No.: US 12,080,215 B2
(45) Date of Patent: Sep. 3, 2024

(54) SEAMLESS TRANSITION FOR MULTIPLE DISPLAY BRIGHTNESS MODES

(71) Applicant: Google LLC, Mountain View, CA (US)

(72) Inventor: Chien-Hui Wen, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/036,323

(22) PCT Filed: Nov. 13, 2020

(86) PCT No.: PCT/US2020/060413
§ 371 (c)(1),
(2) Date: May 10, 2023

(87) PCT Pub. No.: WO2022/103399
PCT Pub. Date: May 19, 2022

(65) Prior Publication Data
US 2023/0343267 A1    Oct. 26, 2023

(51) Int. Cl.
*G09G 3/20*  (2006.01)
*G06F 3/04847*  (2022.01)
(Continued)

(52) U.S. Cl.
CPC ....... *G09G 3/2007* (2013.01); *G06F 3/04847* (2013.01); *G06F 3/0488* (2013.01);
(Continued)

(58) Field of Classification Search
CPC ......... G09G 3/2007; G09G 2320/0673; G09G 2354/00; G09G 2320/0686;
(Continued)

(56) References Cited

U.S. PATENT DOCUMENTS

2019/0102597 A1    4/2019    Lu et al.
2019/0116304 A1    4/2019    Hasinoff et al.
(Continued)

FOREIGN PATENT DOCUMENTS

EP        1220193        7/2002
JP     2004-355405      12/2004
(Continued)

OTHER PUBLICATIONS

International Searching Authority, International Search Report and Written Opinion mailed on Sep. 14, 2021, issued in connection with International Patent Application No. PCT/US2020/060413, filed Nov. 13, 2020, 23 pages.

*Primary Examiner* — Muhammad N Edun
(74) *Attorney, Agent, or Firm* — McDonnell Boehnen Hulbert & Berghoff LLP

(57) ABSTRACT

An example device includes a display component that is configured to operate at a first brightness level or a second brightness level. The device also includes one or more processors operable to perform operations. The operations include detecting, by the display component and while the display component is operating at the first brightness level, a fingerprint authentication triggering event. The operations further include determining, based on the fingerprint authentication triggering event, a first portion of the graphical user interface to operate at the second brightness level. The operations also include transitioning the display component from the first brightness level to the second brightness level. The operations additionally include displaying a second portion of the display component based on applying, to the second portion, one of: (1) the first brightness level, or (2) a value offset to a gray level for the second brightness level.

21 Claims, 7 Drawing Sheets

(51) Int. Cl.
*G06F 3/0488* (2022.01)
*G06V 40/12* (2022.01)

(52) U.S. Cl.
CPC .... *G06V 40/12* (2022.01); *G06F 2203/04804* (2013.01); *G09G 2320/0626* (2013.01); *G09G 2320/0673* (2013.01); *G09G 2320/0686* (2013.01); *G09G 2354/00* (2013.01); *G09G 2360/144* (2013.01)

(58) Field of Classification Search
CPC ..... G09G 2320/0626; G09G 2360/144; G09G 3/20; G09G 2358/00; G06F 3/0488; G06F 3/04847; G06F 21/31; G06F 2203/04804; G06V 40/12

See application file for complete search history.

(56) References Cited

U.S. PATENT DOCUMENTS

| | | | |
|---|---|---|---|
| 2019/0278967 A1* | 9/2019 | Shepelev | G06F 21/32 |
| 2020/0175246 A1* | 6/2020 | Park | G06V 40/1318 |
| 2020/0286431 A1 | 9/2020 | Sugiyama et al. | |
| 2020/0394945 A1* | 12/2020 | Shin | G06V 40/1318 |
| 2021/0012717 A1* | 1/2021 | Park | G09G 3/20 |

FOREIGN PATENT DOCUMENTS

| | | |
|---|---|---|
| JP | 2008-287702 | 11/2008 |
| JP | 2010-130102 | 6/2010 |
| JP | 2019-511856 | 4/2019 |
| JP | 2020-144256 | 9/2020 |
| WO | 2019/183786 | 10/2019 |

\* cited by examiner

SEAMLESS TRANSITION FOR MULTIPLE DISPLAY BRIGHTNESS MODES

This application is a national stage application under 35 U.S.C. § 371 of International Application No. PCT/US2020/060413, filed Nov. 13, 2020, the disclosure of which is explicitly incorporated by reference herein in its entirety.

BACKGROUND

A display brightness level may refer to a perceived intensity of light emanating from a display screen of a computing device. A display brightness mode may refer to a range of brightness levels. For example, a normal mode may correspond to a brightness level from 0-500 candela per square meter, and a high brightness mode may correspond to a brightness level from 800-900 candela per square meter. Different brightness levels may require different power usage, and lead to differing user experiences. Sometimes, a computing device can transition between multiple brightness modes for the display screen.

SUMMARY

The present disclosure generally relates to a display component of a computing device. The display component may be configured to operate at multiple brightness levels. Depending on one or more triggering events, a controller of the computing device may transition the display component from a first brightness level to a second brightness level. For example, when authenticating a fingerprint using the display screen, the computing device may transition from a normal mode to a high brightness mode, and after an authentication is performed, the computing device may transition back to normal mode. Brightness of different portions of the display component may be adjusted when authenticating the fingerprint.

In a first aspect, a device is provided. The device includes a display component. The display component is configured to operate at a first brightness level or a second brightness level. The device also includes one or more processors operable to perform operations. The operations include detecting, by the display component and while the display component is operating at the first brightness level, a fingerprint authentication triggering event. The operations further include determining, based on the fingerprint authentication triggering event, a first portion of the graphical user interface to operate at the second brightness level. The operations also include transitioning the display component from the first brightness level to the second brightness level. The operations additionally include displaying a second portion of the display component based on applying, to the second portion, one of: (1) the first brightness level, or (2) a value offset to a gray level for the second brightness level.

In a second aspect, a computer-implemented method is provided. The method includes detecting, via a graphical user interface displayed by a display component and while the display component is operating at a first brightness level, a fingerprint authentication triggering event. The display component is configured to operate at the first brightness level or a second brightness level. The method also includes determining, based on the fingerprint authentication triggering event, a first portion of the graphical user interface to operate at the second brightness level. The first portion is to be operated at the second brightness level. The method further includes transitioning, in response to the fingerprint authentication triggering event, the display component from the first brightness level to the second brightness level. The method additionally includes displaying a second portion of the display component based on applying, to the second portion, one of: (1) the first brightness level, or (2) a value offset to a gray level for the second brightness level.

In a third aspect, an article of manufacture is provided. The article of manufacture may include a non-transitory computer-readable medium having stored thereon program instructions that, upon execution by one or more processors of a computing device, cause the computing device to carry out operations. The operations include detecting, by a display component and while the display component is operating at the first brightness level, a fingerprint authentication triggering event. The operations further include determining, based on the fingerprint authentication triggering event, a first portion of the graphical user interface to operate at the second brightness level. The operations also include transitioning the display component from the first brightness level to the second brightness level. The operations additionally include displaying a second portion of the display component based on applying, to the second portion, one of: (1) the first brightness level, or (2) a value offset to a gray level for the second brightness level.

In a fourth aspect, a system is provided. The system includes means for detecting, by a display component and while the display component is operating at the first brightness level, a fingerprint authentication triggering event; means for determining, based on the fingerprint authentication triggering event, a first portion of the graphical user interface to operate at the second brightness level; means for transitioning the display component from the first brightness level to the second brightness level; and means for displaying a second portion of the display component based on applying, to the second portion, one of: (1) the first brightness level, or (2) a value offset to a gray level for the second brightness level.

Other aspects, embodiments, and implementations will become apparent to those of ordinary skill in the art by reading the following detailed description, with reference where appropriate to the accompanying drawings.

DETAILED DESCRIPTION

Figure 1:
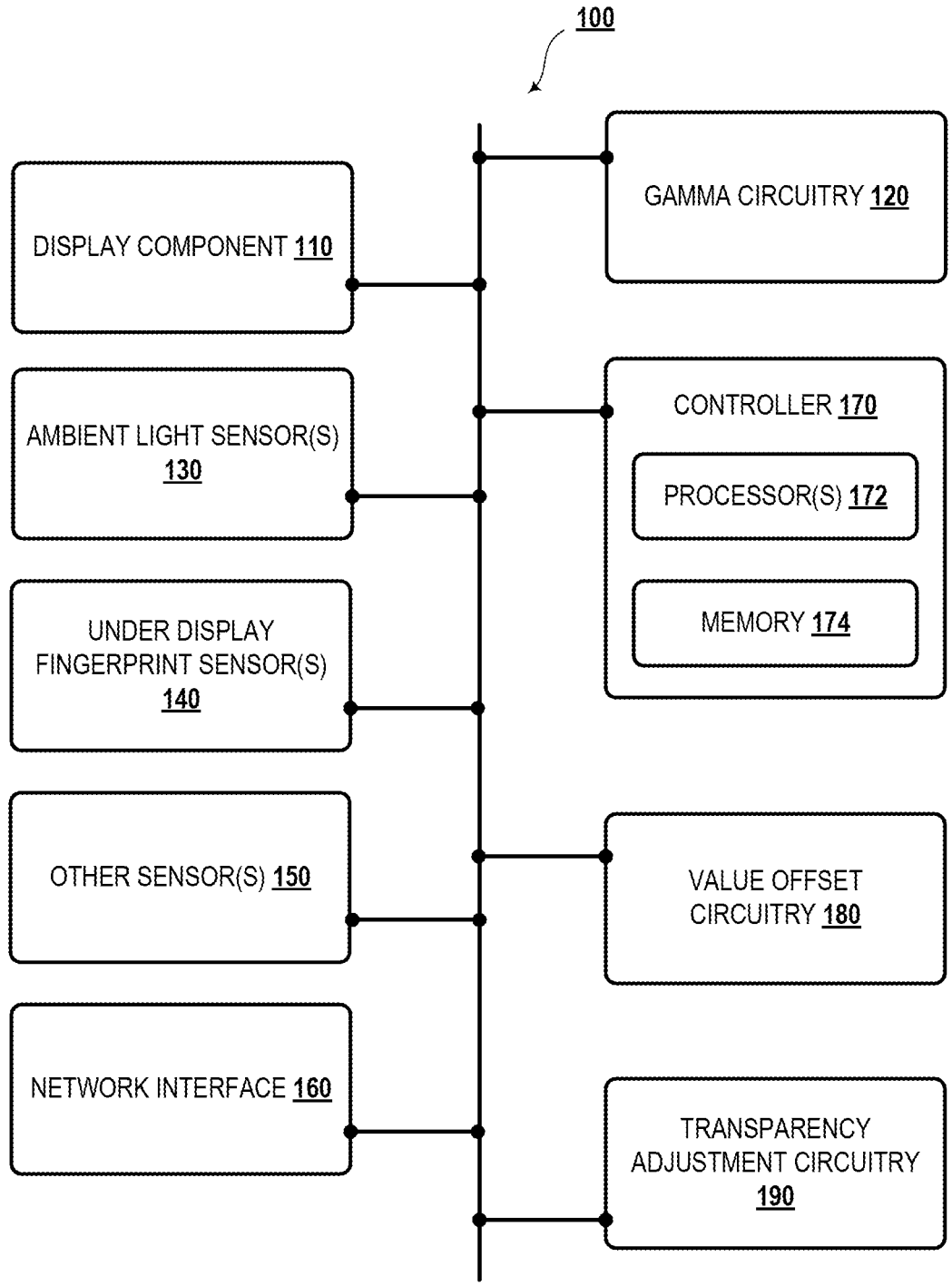
FIG. 1 illustrates a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

An under display fingerprint sensor (UDFPS) is an optical sensor that is laminated underneath a display component of a computing device. In order for the sensor to work during fingerprint authentication, light emitted by the display component is reflected back from a finger to be authenticated, back to the sensor. Generally, the display component may operate at a normal mode that corresponds to a low brightness level. Brightness levels can be measured as candelas per a square meter value or nits. Accordingly, the display component may operate at a normal mode that corresponds to at or below 500 nits. However, a high brightness mode for the display component may be desirable when authenticating the fingerprint. For example, to meet signal-to-noise ratio (SNR) requirements, the display component may need to be operated at 900 nits or more. However, changing from the normal mode to the high brightness mode can also cause optical defects, such as flicker.

Optical characteristics may differ between a normal mode and a high brightness mode. Specifically, the luminance and color of the display component may differ between the normal mode and the high brightness mode. When the display component switches from the normal mode to the high brightness mode (and vice versa), this optical difference may manifest itself as an optical defect on the display component. Consequently, the optical defect may become highly pronounced and detrimental to a user's experience. Further, because human eyes are highly sensitive to luminance and/or color changes at low brightness settings, the optical defect is especially noticeable when the brightness of the display component is low and/or when the ambient light of the environment surrounding the display component is low.

Some techniques described herein address these issues by dynamically adjusting the brightness mode transition based on a portion of the display component where the fingerprint authentication is taking place, and a portion where the fingerprint authentication is not taking place. Specifically, a computing device may transition the display component from the first brightness level to the second brightness level, and apply the first brightness level to the portion where the fingerprint authentication is not taking place. Alternatively, a computing device may transition the display component from the first brightness level to the second brightness level, and apply a value offset to a gray level for the second brightness level. Moreover, other environmental measurements, such as ambient environmental light intensity, may also be utilized to dynamically adjust the brightness transition.

By using the herein-described techniques, multiple brightness levels can be utilized while reducing or eliminating any optical defect. Other advantages are also contemplated and will be appreciated from the discussion herein.

II. Example Devices

FIG. 1 illustrates computing device 100, in accordance with example embodiments. Computing device 100 includes display component 110, gamma circuitry 120, one or more ambient light sensors 130, one or more under display fingerprint sensors 140, one or more other sensors 150, network interface 160, controller 170, value offset circuitry 180, and transparency adjustment circuitry 190. In some examples, computing device 100 may take the form of a desktop device, a server device, or a mobile device. Computing device 100 may be configured to interact with an environment. For example, computing device 100 may obtain fingerprint information from an environment around computing device 100. Also, for example, computing device 100 may obtain environmental state measurements associated with an environment around computing device 100 (e.g., ambient light measurements, etc.).

Display component 110 may be configured to provide output signals to a user by way of one or more screens (including touch screens), cathode ray tubes (CRTs), liquid crystal displays (LCDs), light emitting diodes (LEDs), displays using digital light processing (DLP) technology, and/or other similar technologies. Display component 110 may also be configured to generate audible outputs, such as with a speaker, speaker jack, audio output port, audio output device, earphones, and/or other similar devices. Display component 110 may further be configured with one or more haptic components that can generate haptic outputs, such as vibrations and/or other outputs detectable by touch and/or physical contact with computing device 100.

In example embodiments, display component 110 is configured to operate at a given brightness level. The brightness level may correspond to an operation being performed by the display component. For example, when a UDFPS is activated, display component 110 may operate at a brightness level corresponding to 800 or 900 nits. In example embodiments, display component 110 may operate at a low brightness level corresponding to 2 nits to account for low environmental light intensity. In some other examples, display component 110 may operate at a normal brightness level corresponding to 500 nits.

In certain embodiments, display component 110 may be a color display utilizing a plurality of color channels for generating images. For example, display component 110 may utilize red, green, and blue (RGB) color channels, or cyan, magenta, yellow, and black (CMYK) color channels, among other possibilities. As further described below, gamma circuitry 120 may adjust the gamma characteristics for each of the color channels of display component 110.

In some embodiments, display component 110 may include a plurality of pixels disposed in a pixel array defining a plurality of rows and columns. For example, if display component 110 had a resolution of 1024×600, each column of the array may include 600 pixels and each row of the array may include 1024 groups of pixels, with each group including a red, blue, and green pixel, thus totaling 3072 pixels per row. In example embodiments, the color of a particular pixel may depend on a color filter that is disposed over the pixel.

In example embodiments, display component 110 may receive image data from controller 170 and correspondingly send signals to its pixel array in order to display the image data. To send image data to display component 110, controller 170 may first convert a digital image into numerical data that can be interpreted by display component 110. For instance, a digital image may contain various image pixels that correspond to respective pixels of display component 110. Each image pixel of the digital image may have a numerical value that represents the luminance (e.g., brightness or darkness) of the digital image at a particular spot. These numerical values may be referred to as "gray levels." The number of gray levels may depend on the number of bits used to represent the numerical values. For example, if 8 bits were used to represent a numerical value, display component 110 may provide 256 gray levels, with a numerical value of 0 corresponding to full black and a numerical value of 255 corresponding to full white. As a more specific example, controller 170 may provide to display component 110 a digital image stream containing 24 bits, with 8 bits corresponding to a gray level for each of the red, green, and blue color channels of a pixel group.

In some cases, the luminance characteristics of images displayed by display component 110 may be depicted inaccurately when perceived by users. Such inaccuracies may result from the non-linear response of the human eye and could cause inaccurate portrayals of color/luminance on display component 110 from the viewpoint of users. To compensate for such inaccuracies, computing device 100 could use gamma circuitry 120.

Gamma circuitry 120 may include circuitry that could compensate for inaccuracies that occur when displaying images on display component 110. To do this, gamma circuitry may include memory for storing one or more gamma curves/tables. The values in each curve/table may be determined based upon the transmittance sensitivities of display component 110 over a range of input gray levels.

Figure 2:
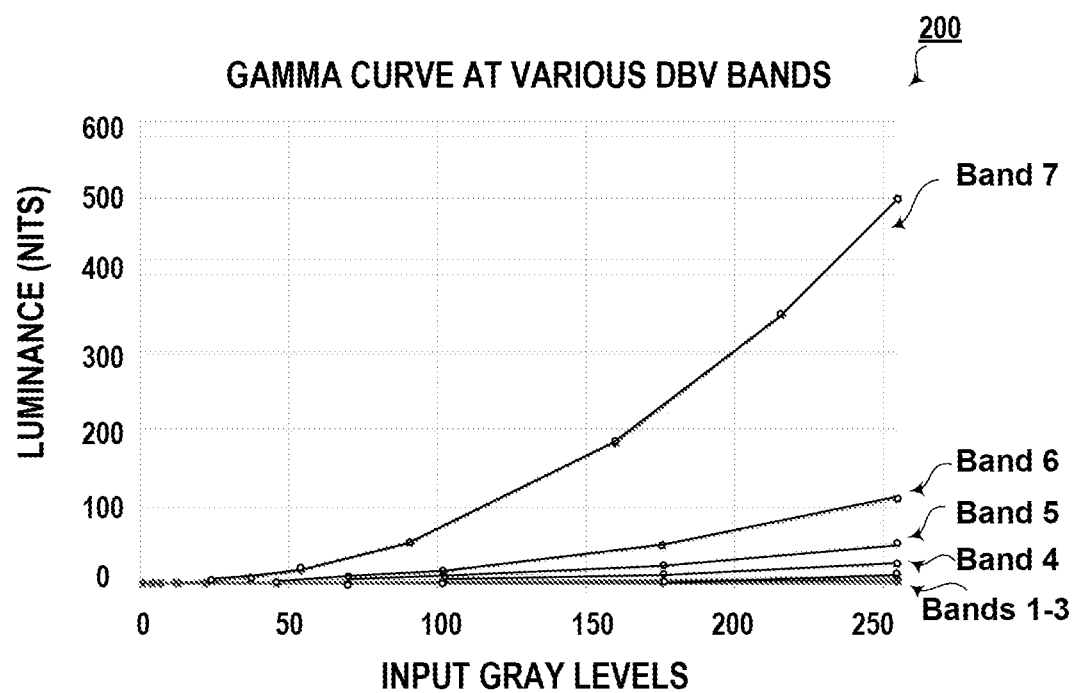
FIG. 2 depicts a graph illustrating example gamma curves, in accordance with example embodiments.

As an illustrative example, FIG. 2 depicts graph 200 that includes various gamma curves. Each gamma curve may correspond to a display brightness value (DBV) band. The use of a particular DBV band (and thus a particular gamma curve) may be based on user input. For instance, a user may select, perhaps by interacting with a brightness adjustment bar, a maximum brightness for display component 110. Based on that maximum brightness, display component 110 may choose a corresponding DBV band (and thus a corresponding gamma curve) to compensate for inaccuracies that occur when displaying images.

As shown in graph 200, each gamma curve includes a relationship between input gray levels (on the x-axis) and luminance of a viewable image displayed on display component 110 (on the y-axis). These relationships are non-linear. For instance, in band 7, an input gray level of 200 corresponds to a luminance value of 300 nits. Consequently, by using a gamma curve to adjust input gray levels, the images displayed on display component 110 may exhibit a non-linear luminance to input gray level relationship. Yet, when viewed by a user, the response of the human eye may cause the user to perceive the displayed images as having a linear relationship between luminance and input gray level. Thus, by using gamma curves, display component 110 is able to produce images that may be perceived by a user as having a generally linear relationship with regard to input gray level and luminance.

Referring again to FIG. 1, ambient light sensor(s) 130 may be configured to receive light from an environment of (e.g., within 1 meter (m), 5 m, or 10 m of) computing device 100. Ambient light sensor(s) 130 may include one or more single photon avalanche detectors (SPADs), avalanche photodiodes (APDs), complementary metal oxide semiconductor (CMOS) detectors, and/or charge-coupled devices (CCDs). For example, ambient light sensor(s) 130 may include indium gallium arsenide (InGaAs) APDs configured to detect light at wavelengths around 1550 nanometers (nm). Other types of ambient light sensor(s) 130 are possible and contemplated herein.

In some embodiments, ambient light sensor(s) 130 may include a plurality of photodetector elements disposed in a one-dimensional array or a two-dimensional array. For example, ambient light sensor(s) 130 may include sixteen detector elements arranged in a single column (e.g., a linear array). The detector elements could be arranged along, or could be at least parallel to, a primary axis.

In some embodiments, computing device 100 can include one or more under display fingerprint sensor(s) 140. In some embodiments, under display fingerprint sensor(s) 140 may include one or more image capture devices that can take an image of a finger. Under display fingerprint sensor(s) 140 are utilized to authenticate a fingerprint. The image of the finger captured by the one or more image capture devices is compared to a stored image for authentication purposes. The light from display component 110 is reflected from the finger back to the under display fingerprint sensor(s) 140. There may be loss of light emanating from the display, and a loss from a low reflection. A high brightness level is generally needed to illuminate the finger adequately to meet SNR requirements, and avoid the loss from the display, and/or from the reflection. In some embodiments, under display fingerprint sensor(s) 140 is configured with a time threshold within which the authentication process is to be completed. When the authentication process is not completed within the time threshold, the authentication process fails. In some embodiments, display component 110 may attempt to re-authenticate the fingerprint. Such repetitive authentication processes can cause a high consumption of power, and can cause optical defects perceptible to the user of computing device 100.

In some embodiments, computing device 100 can include one or more other sensors 150. Other sensor(s) 150 can be configured to measure conditions within computing device 100 and/or conditions in an environment of (e.g., within 1 m, 5 m, or 10 m of) computing device 100 and provide data about these conditions. For example, other sensor(s) 150 can include one or more of: (i) sensors for obtaining data about computing device 100, such as, but not limited to, a thermometer for measuring a temperature of computing device 100, a battery sensor for measuring power of one or more batteries of computing device 100, and/or other sensors measuring conditions of computing device 100; (ii) an identification sensor to identify other objects and/or devices, such as, but not limited to, a Radio Frequency Identification (RFID) reader, proximity sensor, one-dimensional barcode reader, two-dimensional barcode (e.g., Quick Response (QR) code) reader, and/or a laser tracker, where the identification sensor can be configured to read identifiers, such as RFID tags, barcodes, QR codes, and/or other devices and/or objects configured to be read, and provide at least identifying information; (iii) sensors to measure locations and/or movements of computing device 100, such as, but not limited to, a tilt sensor, a gyroscope, an accelerometer, a Doppler sensor, a Global Positioning System (GPS) device, a sonar sensor, a radar device, a laser-displacement sensor, and/or a compass; (iv) an environmental sensor to obtain data indicative of an environment of computing device 100, such as, but not limited to, an infrared sensor, an optical sensor, a biosensor, a capacitive sensor, a touch sensor, a temperature sensor, a wireless sensor, a radio sensor, a movement sensor, a proximity sensor, a radar receiver, a microphone, a sound sensor, an ultrasound sensor and/or a smoke sensor; and/or (v) a force sensor to measure one or more forces (e.g., inertial forces and/or G-forces) acting about computing device 100, such as, but not limited to one or more sensors that measure: forces in one or more dimensions, torque, ground force, friction, and/or a zero moment point (ZMP) sensor that identifies ZMPs and/or locations of the ZMPs. Many other examples of other sensor(s) 150 are possible as well.

Data gathered from ambient light sensors(s) 130, under display fingerprint sensor(s) 140, and other sensor(s) 150 may be communicated to controller 170, which may use the data to perform one or more actions.

Network interface 160 can include one or more wireless interfaces and/or wireline interfaces that are configurable to communicate via a network. Wireless interfaces can include one or more wireless transmitters, receivers, and/or transceivers, such as a Bluetooth™ transceiver, a Zigbee® transceiver, a Wi-Fi™ transceiver, a WiMAX™ transceiver, and/or other similar types of wireless transceivers configurable to communicate via a wireless network. Wireline interfaces can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network interface 160 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

Controller 170 may include one or more processors 172 and memory 174. Processor(s) 172 can include one or more general purpose processors and/or one or more special purpose processors (e.g., display driver integrated circuit (DDIC), digital signal processors (DSPs), tensor processing units (TPUs), graphics processing units (GPUs), application specific integrated circuits (ASICs), etc.). Processor(s) 172 may be configured to execute computer-readable instructions that are contained in memory 174 and/or other instructions as described herein.

Memory 174 may include one or more non-transitory computer-readable storage media that can be read and/or accessed by processor(s) 172. The one or more non-transitory computer-readable storage media can include volatile and/or non-volatile storage components, such as optical, magnetic, organic or other memory or disc storage, which can be integrated in whole or in part with at least one of processor(s) 172. In some examples, memory 174 can be implemented using a single physical device (e.g., one optical, magnetic, organic or other memory or disc storage unit), while in other examples, memory 174 can be implemented using two or more physical devices.

In example embodiments, processor(s) 172 are configured to execute instructions stored in memory 174 so as to carry out operations.

The operations may include detecting, via a graphical user interface displayed by display component 110 and while display component 110 is operating at a first brightness level (e.g., normal mode), a fingerprint authentication triggering event. For example, display component 110 may be operating at a normal brightness mode of 500 nits. In some embodiments, the fingerprint authentication triggering event involves a physical interaction between a user and the graphical user interface displayed by display component 110.

The operations may also include determining, based on the fingerprint authentication triggering event, a first portion of the graphical user interface to operate at the second brightness level (e.g., high brightness mode of 900 nits).

In some embodiments, the brightness value for the normal mode or the high brightness mode can be a relative value. For example, the brightness value may be a percentage of a total possible brightness for display component 110 (e.g., 45% or 55%). In some embodiments, the brightness value may be an absolute value. For example, the brightness value may be a value expressed in candelas per a square meter value or nits (e.g., 60 nits or 80 nits).

The operations may further include transitioning, in response to the fingerprint authentication triggering event, the display component 110 from the first brightness level (e.g., normal brightness mode) to the second brightness level (high brightness mode). For example, controller 170 may transition display component 110 from a 500 nits brightness level to a 900 nits brightness level.

The operations may also include displaying a second portion of the display component based on applying, to the second portion, one of: (1) the first brightness level, or (2) a value offset to a gray level for the second brightness level. For example, controller 170 may display the second portion at the normal brightness level of 500 nits by applying a masking layer to the second portion, while displaying the first portion at the high brightness level of 900 nits to enable fingerprint detection and/or authentication. Also, for example, controller 170 may display the second portion by applying a value offset to a gray level for the second brightness level.

Value offset circuitry 180 may include circuitry that could compensate for the gray level for the second brightness level on display component 110. To do this, value offset circuitry 180 may include memory for storing one or more gamma curves/tables. The values in each curve/table may be determined based upon the transmittance sensitivities of display component 110 over a range of input gray levels.

Transparency adjustment circuitry 190 may include circuitry that could compensate for inaccuracies that occur when displaying images on display component 110. To do this, transparency adjustment circuitry 190 may include memory for determining and/or storing one or more transparency percentages. The percentages may be determined based upon the values in gamma circuitry 120 of display component 110 over a range of brightness levels for normal mode and high brightness mode.

Figure 3:
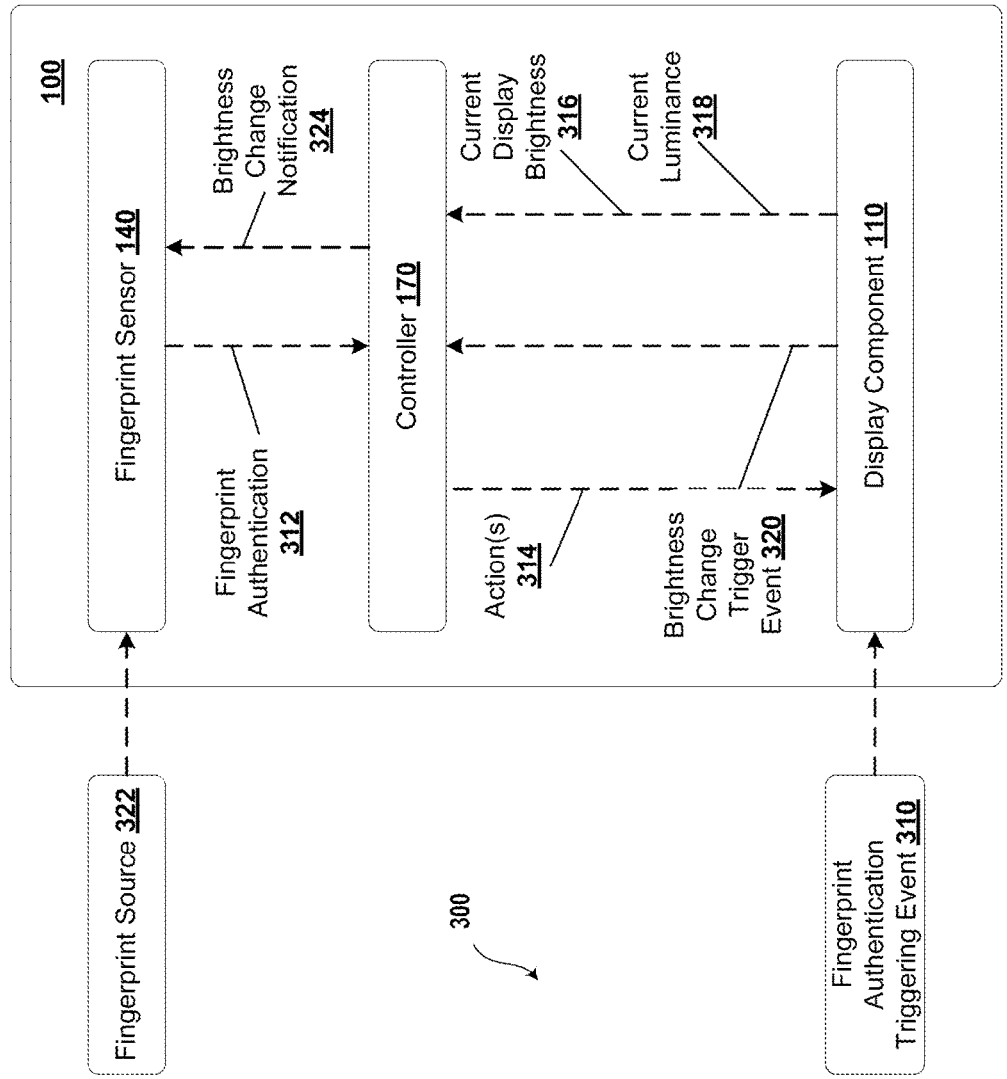
FIG. 3 illustrates a relationship between a computing device and an environment, in accordance with example embodiments.

FIG. 3 illustrates a relationship between computing device 100 and environment 300, in accordance with example embodiments. Environment 300 may represent the environment surrounding computing device 100 and includes fingerprint source 322 and fingerprint authentication triggering event 310 (e.g., sensing the finger near display component 110).

Fingerprint authentication triggering event 310 may represent an event external to computing device 100. Fingerprint authentication triggering event 310 may act on display component 110. In some embodiments, fingerprint authentication triggering event 310 may include a user touching a touch screen interface of display component 110 to initiate a fingerprint authentication process. In some embodiments, fingerprint authentication triggering event 310 may include a finger hovering over a touch screen interface of display component 110 to initiate a fingerprint authentication process. In some embodiments, fingerprint authentication triggering event 310 may cause display component 110 to communicate brightness change trigger event 320 to controller 170, which may responsively perform action(s) 314 based on brightness change trigger event 320. In some embodiments, fingerprint authentication triggering event 310 may cause display component 110 to communicate current display brightness 316 and current luminance 318 to controller 170.

For example, upon receiving brightness change trigger event 320, controller 170 may transition display component 110 from a first brightness level (e.g., 500 nits) to second brightness level (e.g., 900 nits). Generally, a sudden transition from a low brightness mode to a high brightness mode can cause an optical defect. For example, when a user views a screen at night, a change in the brightness level to 900 nits causes the screen to appear very bright. For example, ambient light sensor(s) 130 may receive ambient light measurements from the environment around computing device 100, and the brightness level for the normal mode may be set at 2 nits. One solution may be to maintain the fingerprint sensing area at 900 nits, while displaying the remaining portion of the screen at 2 nits (compatible with the low environmental lighting conditions at night). However, such a configuration causes bending to occur. So it is desirable to transition display component 110 from the first brightness level to the second brightness level in a smooth manner so as to reduce and/or eliminate a perceived bending, flicker, or other optical defect.

In some embodiments, upon receiving the current display brightness 316 and current luminance 318, controller 170 may cause display component 110 to display a second portion of the display component based on applying, to the second portion, one of: (1) the first brightness level, or (2) a value offset to a gray level for the second brightness level. For example, controller 170 may cause display component 110 to display a second portion of the display component by applying, to the second portion, a masking layer at the first brightness level, while maintaining the first portion (i.e., the fingerprint authentication portion), at the second or high brightness level. Also, for example, controller 170 may cause display component 110 to display a second portion of the display component by applying, to the second portion, a value offset to a gray level for the second brightness level. In some embodiments, the value offset to the gray level is based on a relationship between gray levels and luminance values, as described herein. In some embodiments, the value offset is based on values of current display brightness 316 and current luminance 318 received by controller 170.

For example, because human eyes are highly sensitive to luminance and/or color changes at low brightness settings, the visual flickering is especially noticeable when the brightness of display component 110 is low and/or when the ambient light of the environment surrounding computing device 100 is low. In particular, when ambient light is lower than 40 lux and the display brightness is lower than 30%, visual flickering becomes highly conspicuous and detrimental to the user experience. As ambient light increases to between 40 lux and 60 lux and/or the display brightness increases to between 30% and 60%, flicker becomes somewhat acceptable, as the user may only slightly notice the flickering effect. Once the ambient light increases beyond 60 lux and/or the display brightness increases beyond 60%, flicker becomes unproblematic and acceptable, as the user may not notice any flickering effect. Accordingly, the current ambient light and current display brightness of display component 110 may influence the gray level and luminance value settings for a normal mode of operation.

Also, for example, after transitioning display component 110 from the first brightness level to the second brightness level, and after making adjustments to the displayed first portion and second portion, controller 170 may communicate a brightness change notification 324 to fingerprint sensor(s) 140. Fingerprint sensor(s) 140 may be optically-coupled to environment 300. That is, the arrangement of fingerprint sensor(s) 140 within computing device 100 may enable fingerprint sensor(s) 140 to capture an image of the finger at fingerprint source 322 from a field of view of environment 300.

Fingerprint sensor(s) 140 may, in response to receiving brightness change notification 324, capture the image of a finger at fingerprint source 322. For example, fingerprint source 322 may include a finger to be authenticated, and fingerprint sensor(s) 140 may receive light reflected off of the finger in environment 300. As indicated, the second brightness level conforms to SNR requirements. Upon capturing the image, fingerprint sensor(s) 140 may attempt to authenticate the fingerprint, and communicate the results to controller 170 as fingerprint authentication 312.

In some embodiments, fingerprint authentication triggering event 310 may cause controller 170 to start an internal clock. The internal clock can determine an allowable time threshold within which fingerprint authentication 312 has to be completed. Upon completion of the fingerprint authentication within the time threshold, controller 170 may stop the internal clock. However, when the fingerprint authentication is not completed within the time threshold, the internal clock may stop and controller 170 may direct fingerprint sensor(s) 140 to terminate the authentication process. For example, the fingerprint authentication may not be completed within the time threshold when the image resolution of the fingerprint does not meet SNR requirements. One or more additional and/or alternate factors may cause the fingerprint authentication to not be completed within the time threshold. For example, the one or more factors may include an intensity of ambient light, a distance of fingerprint source 322 from computing device 100, and/or a fingerprint from fingerprint source 322 not matching the stored fingerprint.

Upon termination of the authentication process, controller 170 may cause display component 110 to transition from the second brightness level to the first brightness level. Also, for example, when controller 170 applies a masking layer, upon termination of the authentication process, controller 170 may remove the masking layer. In some embodiments, where controller 170 applies a value offset to the gray level, upon termination of the authentication process, controller 170 may revert to luminance values at the normal mode or first brightness level.

While FIG. 3 illustrates a particular arrangement of elements, other arrangements are possible. Additionally or alternatively, some elements of computing device 100 and environment 300 may be combined and/or rearranged.

III. Example Display Brightness Transitions

Figure 4:
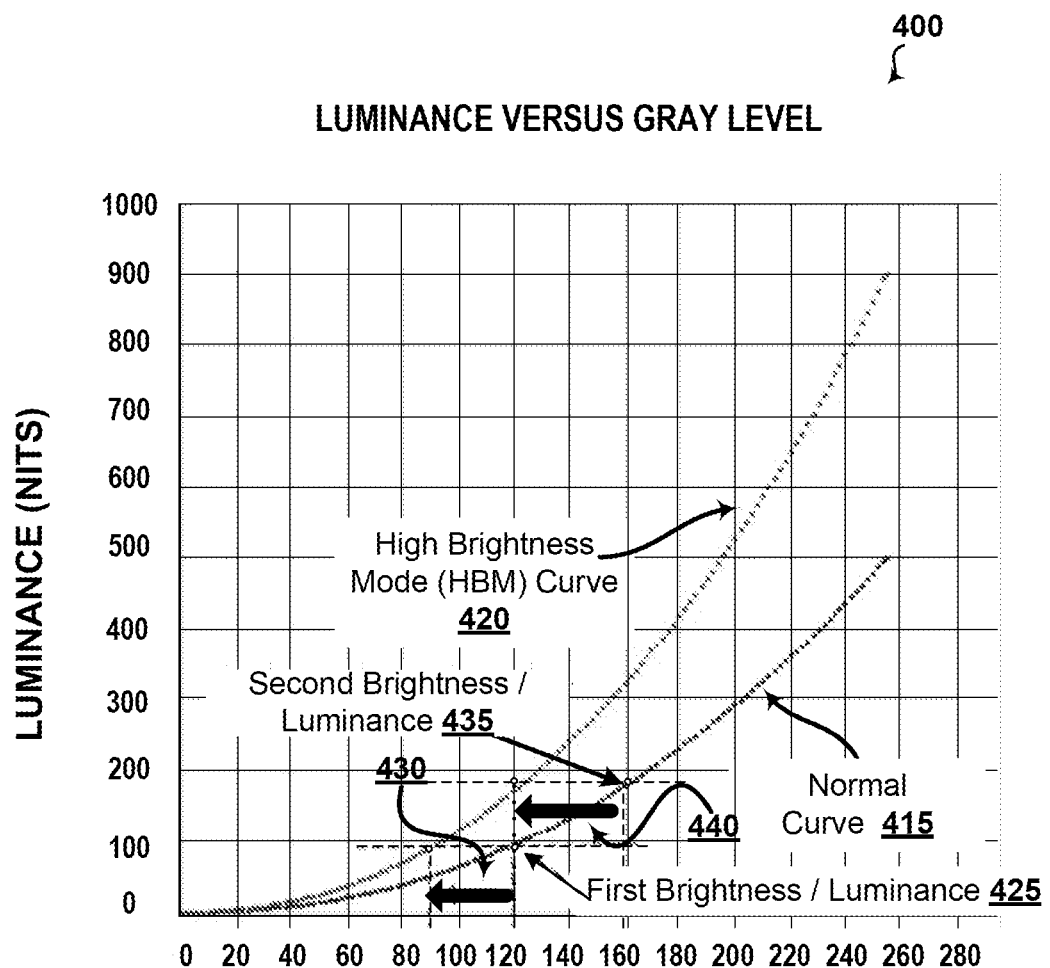
FIG. 4 depicts a graph and tables illustrating display luminance versus gray level, in accordance with example embodiments.
Figure 5:
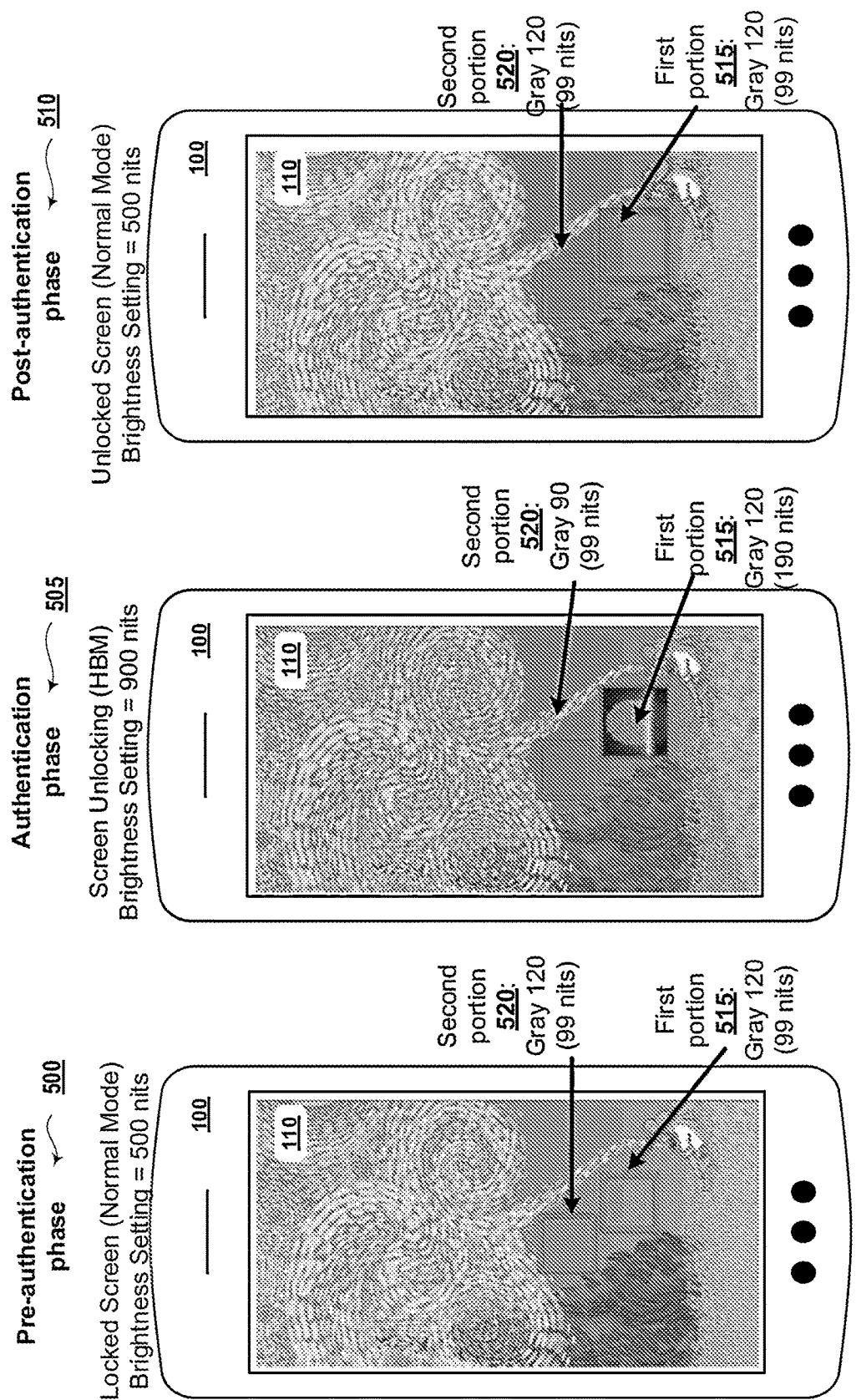
FIG. 5 depicts a computing device illustrating example display brightness transitions, in accordance with example embodiments.

FIG. 4 depicts a graph 400 and tables 405 and 410 illustrating display luminance versus gray level, in accordance with example embodiments. Namely, the graph 400 and the tables 405 and 410 of FIG. 5 are provided as an example of a graph and tables that may be utilized by controller 170 to adjust the brightness level of display component 110.

The horizontal axis of graph 400 displays gray levels in a range from 0 to 280 and a corresponding luminance is displayed along the vertical axis. Graph 400 includes two curves. Normal curve 415 displays luminance versus gray level in the normal mode, with the display luminance values ranging from 0 to 500 nits. High Brightness (HB) curve 410 displays luminance versus gray level in the high brightness mode (HBM), with the display luminance values ranging from 0 to 900 nits.

In some embodiments, normal curve 415 and HB curve 420 may be predetermined for computing device 100. For example, normal curve 415 and HB curve 420 may correspond to the following equations, respectively, with γ=2.2:

$$L_{Grey\,x, normal\,mode} = \left(\frac{Grey\,x}{Grey\,255}\right)^\gamma * L_{Grey\,225, normal\,mode} \quad \text{(Eqn. 1)}$$

$$L_{Grey\,y, HBM} = \left(\frac{Grey\,y}{Grey\,255}\right)^\gamma * L_{Grey\,255, HBM} \quad \text{(Eqn. 2)}$$

In some embodiments, Eqn. 1 and Eqn. 2 may be programmed into the display driver integrated circuit (DDIC). In some embodiments, curves corresponding to multiple values of γ can be programmed into the DDIC.

In some embodiments, controller 170 may cause display component 110 to be displayed at a first brightness/luminance value 425 of 99 nits. For example, first brightness/luminance value 425 of 99 nits is shown to correspond to a gray level of 120 for normal curve 415, and to a gray level of 90 for HB curve 420. Controller 170 may also retrieve these values from tables 405 and 415. Also, for example, controller 170 may apply a first value offset 430 to the gray level for display component 110, by changing the gray level from 120 to 90, corresponding to the respective gray levels for normal mode and HB mode.

As a further example, controller 170 may cause display component 110 to be displayed at a second brightness/luminance value 435 of 190 nits. For example, second brightness/luminance value 435 of 190 nits is shown to correspond to a gray level of 160 for normal curve 415, and to a gray level of 120 for HB curve 420. Controller 170 may also retrieve these values from tables 405 and 415. Also, for example, controller 170 may apply a second value offset 440 to the gray level for display component 110, by changing the gray level from 160 to 120, corresponding to the respective gray levels for normal mode and HB mode.

In some embodiments, a lookup table may be stored in memory 174, where the lookup table represents, for different values of γ, the relationship between luminance values and gray levels corresponding to different brightness levels. For example, table 405 and table 410 illustrate lookup tables based on normal curve 415 and HB curve 420, respectively. As indicated in table 405, a gray level value of 120 in normal mode corresponds to a luminance value of 99 nits. Also, for example, a gray level value of 160 in normal mode corresponds to a luminance value of 190 nits.

Likewise, table 410 indicates that a gray level value of 90 in HB mode corresponds to a luminance value of 99 nits. Also, for example, a gray level value of 120 in HB mode corresponds to a luminance value of 190 nits. In some embodiments, lookup tables such as table 405 and table 410 may be stored in memory 174. In some embodiments, lookup tables corresponding to multiple values of γ can be stored in memory 174. Controller 170 can adjust the luminance and/or gray levels of display component 110 directly by utilizing a graph such as graph 400, and/or by utilizing a lookup table such as table 405 and table 410.

IV. Example Display Brightness Transitions: Value Offset

FIG. 5 depicts a computing device 100 illustrating example display brightness transitions, in accordance with example embodiments. Three phases are illustrated for computing device 100: a pre-authentication phase 500, an authentication phase 505, and a post-authentication phase 510. In the pre-authentication phase 500, display component 110 of computing device 100 may display a locked screen. The authentication phase 505 corresponds to a process for unlocking display component 110, and in the post-authentication phase 510, display component 110 of computing device 100 may display an unlocked screen.

In the pre-authentication phase 500, display component 110 may be operated at a first brightness level corresponding to a normal mode. For example, the first brightness level may be at 500 nits. Based on the settings for the normal mode, controller 170 may configure the gray level for display component 110 to be at 120, and the luminance value to be at 99 nits. For example, controller 170 may retrieve these values from a lookup table such as table 405 of FIG. 4.

In some embodiments, the first brightness level may depend on ambient light intensity. Also, for example, the first brightness level may vary based on an image being displayed. In some embodiments, the first brightness level may vary at an individual pixel level, and/or may vary at a pixel group level.

In the pre-authentication phase 500, controller 170 may detect a fingerprint authentication triggering event occurring at first portion 515 corresponding to a fingerprint sensor area. In some embodiments, controller 170 may identify a portion of display component 110 where a finger is sensed as first portion 515. For example, fingerprint sensor(s) 140 may be positioned under display component 110, and based on where the finger is sensed, controller 170 may identify first portion 515 so as to enable a corresponding fingerprint sensor to be activated for the authentication process. In some embodiments, controller 170 may identify a portion of display component 110 outside first portion 515 as second portion 520. In some embodiments, second portion 520 may be a portion proximate to first portion 515 (e.g., surrounding first portion 515). Based on the settings for the normal mode, the gray level at first portion 515 and second portion 520 may be at 120, and the luminance value may be at 99 nits.

As described herein, to meet SNR requirements, in the authentication phase 505, controller 170 has to operate display component 110 at a high brightness level, such as, for example, 800 nits or 900 nits. Accordingly, in the authentication phase 505, controller 170 transitions display component 110 from the first brightness level (e.g., normal mode at 500 nits) to the second brightness level (e.g., HB mode at 900 nits). For example, based on settings for the HB mode, controller 170 may configure the gray level for display component 110 to be at 120, and the luminance value to be at 190 nits. For example, controller 170 may retrieve these values from a lookup table such as table 410 of FIG. 4. However, such a transition may result in optical defects in a displayed image, such as bending and/or flickering. Also, for example, a rapid transition from a low brightness setting to a high brightness setting may not be desirable for a user of computing device 100.

Accordingly, controller 170 applies a value offset to the gray level for the second brightness level at second portion 520. For example, in order to conform to the high brightness settings required to perform a fingerprint authentication, controller 170 maintains first portion 515 at a gray level of 120 and a corresponding luminance value of 190 nits. However, for second portion 520, controller 170 applies the value offset. In determining the value offset, controller 170 determines a first luminance value of display component 110 at the first brightness level, and calculates the value offset to the gray level for the second brightness level based on the first luminance value.

For example, in determining the value offset, controller 170 identifies an input gray level for the normal mode to be at 120. Controller 170 may utilize the relationship depicted in graph 400 and/or table 405, illustrated in FIG. 4, and determine that the corresponding luminance value is 99 nits in normal mode. Next, controller 170 may utilize the relationship depicted in graph 400 and/or table 410 to determine that the gray level corresponding to a luminance value of 99 nits in HB mode is 90. Thereupon, controller 170 may apply the value offset (e.g., first value offset 430) to the gray level from 120 to 90, and configure the gray level for second portion 520 to be at 90.

As another example, at a brightness setting of 500 nits, normal mode may correspond to a gray level of 160 and a corresponding luminance value of 190 nits. Accordingly, when transitioning to a high brightness setting, controller 170 may utilize the relationship depicted in graph 400 to configure display component 110 to be at a luminance value of 320 nits. However, to avoid optical defects and to enable the authentication process, controller 170 may maintain first portion 515 at a gray level of 160 and a corresponding luminance value of 320 nits. However, for second portion 520, controller 170 applies the value offset. In determining the value offset, controller 170 identifies an input gray level for the normal mode to be at 160. Controller 170 may utilize the relationship depicted in graph 400 and/or table 405, illustrated in FIG. 4, and determine that the corresponding luminance value is 190 nits in normal mode. Next, controller 170 may utilize the relationship depicted in graph 400 and/or table 410 to determine that the gray level corresponding to a luminance value of 190 nits in HB mode is 120. Thereupon, controller 170 may apply the value offset (e.g., second value offset 440) to the gray level from 160 to 120, and configure the gray level for second portion 520 to be at 120.

As described herein, graph 400 and tables 405 and 410 are based on a value of $\gamma=2.2$.

However, different pairs of gamma curves for normal mode and HB mode may be obtained for different values of $\gamma$, and a corresponding value offset may be determined based on a particular pair of gamma curves. Also, for example, gray levels and luminance values may correspond to gamma curves for different DBV bands, and a corresponding value offset may be determined based on a particular DBV band.

In some embodiments, controller 170 may, after transitioning display component 110 from the first brightness level to the second brightness level, detect that the fingerprint authentication triggering event has ended, and/or a threshold time to perform the fingerprint authentication triggering event has expired. Accordingly, controller 170 may, in response to detecting that the fingerprint authentication triggering event has ended, transition display component 110 from the second brightness level to the first brightness level.

For example, in the post-authentication phase 510, controller 170 may display an unlocked screen. Also, for example, controller 170 may reset the gray level and luminance value to the settings in the pre-authentication phase 500.

V. Example Display Brightness Transitions: Masking Layer

Figure 6:
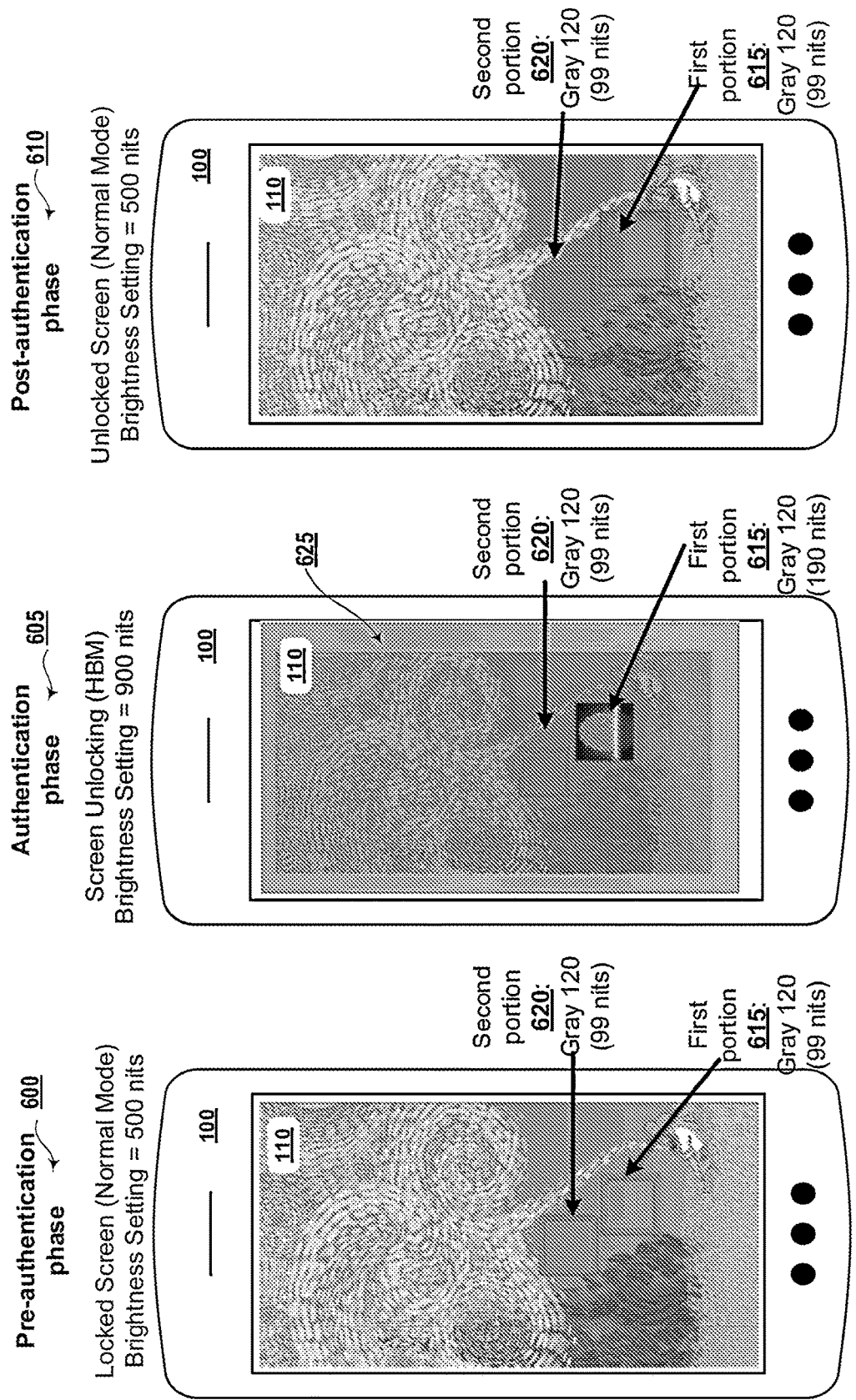
FIG. 6 depicts a computing device illustrating example display brightness transitions, in accordance with example embodiments.

FIG. 6 depicts a computing device illustrating example display brightness transitions, in accordance with example embodiments. Three phases are illustrated for computing device 100: a pre-authentication phase 600, an authentication phase 605, and a post-authentication phase 610. In the pre-authentication phase 600, display component 110 of computing device 100 may display a locked screen. The authentication phase 605 corresponds to a process for unlocking display component 110, and in the post-authentication phase 610, display component 110 of computing device 100 may display an unlocked screen.

In the pre-authentication phase 600, display component 110 may be operated at a first brightness level corresponding to a normal mode. For example, the first brightness level may be at 500 nits. In some embodiments, the first brightness level may depend on ambient light intensity. Also, for example, the first brightness level may vary based on an image being displayed. In some embodiments, the first brightness level may vary at an individual pixel level, and/or may vary at a pixel group level. Based on the settings for the normal mode, controller 170 may configure the gray level for display component 110 to be at 120, and the luminance value to be at 99 nits. For example, controller 170 may retrieve these values from a lookup table such as table 405 of FIG. 4.

In the pre-authentication phase 600, controller 170 may detect a fingerprint authentication triggering event occurring at first portion 615 corresponding to a fingerprint sensor area. In some embodiments, controller 170 may identify a portion of display component 110 where a finger is sensed as first portion 615. For example, fingerprint sensor(s) 140 may be positioned under display component 110, and based on where the finger is sensed, controller 170 may identify first portion 615 so as to enable a corresponding fingerprint sensor to be activated for the authentication process. In some embodiments, controller 170 may identify a portion of display component 110 outside first portion 615 as second portion 620. In some embodiments, second portion 620 may be a portion proximate to first portion 615 (e.g., surrounding first portion 615). Based on the settings for the normal mode, the gray level at first portion 615 and second portion 620 may be at 120, and the luminance value may be at 99 nits.

As described herein, to meet SNR requirements, in the authentication phase 605, controller 170 has to operate display component 110 at a high brightness level, such as, for example, 800 nits or 900 nits. Accordingly, in the authentication phase 605, controller 170 transitions display component 110 from the first brightness level (e.g., normal mode at 500 nits) to the second brightness level (e.g., HB mode at 900 nits). For example, based on settings for the HB mode, controller 170 may configure the gray level for display component 110 to be at 120, and the luminance value to be at 190 nits. For example, controller 170 may retrieve these values from a lookup table such as table 410 of FIG. 4. However, such a transition may result in optical defects in a displayed image, such as bending and/or flickering. Also, for example, a rapid transition from a low brightness setting to a high brightness setting may not be desirable for a user of computing device 100.

Accordingly, controller 170 applies a virtual layer, masking layer 625, to second portion 620 of display component 110. For example, in order to conform to the high brightness settings required to perform a fingerprint authentication, controller 170 maintains first portion 615 at a gray level of 120 and a corresponding luminance value of 190 nits. However, for second portion 520, controller 170 applies masking layer 625. Controller 170 can configure masking layer 625 to correspond to the settings for the first brightness level. For example, based on the settings for the normal mode, the gray level for masking layer 625 may be set at 120, and the luminance value may be set at 99 nits. Note that masking layer 625 is not applied to first portion 615.

In some embodiments, controller 170 can configure masking layer 625 to have a specified level of transparency. For example, transparency may be determined as follows:

$$\text{Transparency Percentage} = \frac{\text{Luminance at First Brightness Level}}{\text{Luminance at Second Brightness Level}} \quad \text{(Eqn. 3)}$$

For example, when the luminance at the first brightness level for normal mode is 500 nits and the luminance at the second brightness level for HB mode is 900 nits, Eqn. 3 can be utilized to obtain the transparency for masking layer 625 as follows:

$$\text{Transparency Percentage} = \frac{500}{900} = 55.6\% \quad \text{(Eqn. 4)}$$

Transparency percentages corresponding to various luminance values can be predetermined, and computing device 100 may be pre-configured with masking layers corresponding to the transparency percentages. In some embodiments, controller 170 may display a user-friendly interactive transparency adjustment bar that a user of computing device 100 can use to adjust a level of transparency. For example, when the transparency percentage is determined to be 55.6%, as in Eqn. 4, then a transparency adjustment bar can be provided to adjust the transparency over a range of percentages, such as, for example, 50-60%. Since masking layer 625 is not applied to first portion 615, changes in transparency do not affect the high brightness settings required for the fingerprint authentication process.

In some embodiments, controller 170 may, after transitioning display component 110 from the first brightness level to the second brightness level, detect that the fingerprint authentication triggering event has ended, and/or a threshold time to perform the fingerprint authentication triggering event has expired. Accordingly, controller 170 may, in response to detecting that the fingerprint authentication triggering event has ended, transition display component 110 from the second brightness level to the first brightness level.

For example, in the post-authentication phase 610, controller 170 may display an unlocked screen. Also, for example, controller 170 may remove masking layer 625, and reset the gray level and luminance value to the settings in the pre-authentication phase 600.

Generally, applying masking layer 625 eliminates optical defects, and there is a reduced power consumption since luminance values and gray levels are not adjusted. However, in some embodiments, display component 110 may include one or more additional virtual layers, that may cause application of masking layer 625 to be burdensome.

Also, for example, application of masking layer 625 overcomes DDIC and display panel limitations. Generally, DDIC and display panel limitations are expensive and are also configured by display makers. Accordingly, masking layer 625 can be applied to any computing device 100 that has an UDFPS. Detection of masking layer 625 can be enabled by checking the image content and the power (e.g., ELVDD, ELVSS output voltages) utilized during authentication phase 605.

As described herein, the first luminance value for the first brightness level may be configured at a pixel level. In some embodiments, the first luminance value for the first brightness level may be configured for a group of pixels. For example, an image may comprise different regions with different gray levels, and the first luminance value for the first brightness level may depend on such different gray levels. Generally, gray levels and luminance values, value offsets and so forth for first portion 515 (resp. first portion 615) and/or second portion 520 (resp. second portion 620) may be configured based on groups of pixels. However, for simplicity, the description herein assumes that the first portion 515 (resp. first portion 615) and/or second portion 520 (resp. second portion 620) respectively correspond to a single gray level and luminance value.

VI. Example Methods

Figure 7:
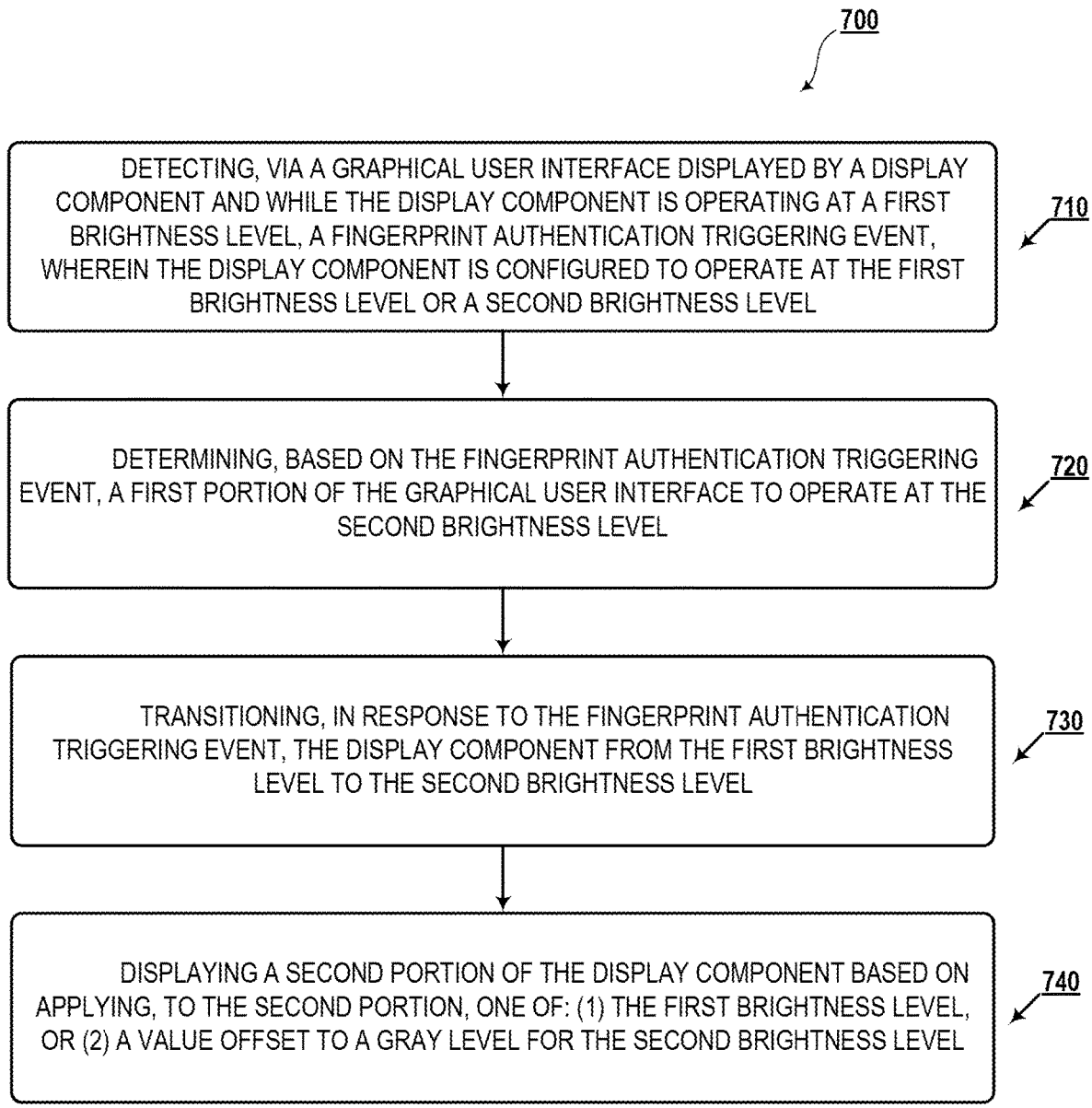
FIG. 7 illustrates a method, in accordance with example embodiments.

FIG. 7 illustrates a method 700, in accordance with example embodiments. Method 700 may include various blocks or steps. The blocks or steps may be carried out individually or in combination. The blocks or steps may be carried out in any order and/or in series or in parallel. Further, blocks or steps may be omitted or added to method 700.

The blocks of method 700 may be carried out by various elements of computing device 100 as illustrated and described in reference to FIGS. 1 and 3. Furthermore, method 700 may utilize the relationships depicted in graphs 200, and/or 400 and/or tables 405, and/or 410 that are illustrated and described with regard to FIGS. 2, and 4.

Block 710 includes detecting, via a graphical user interface displayed by the display component and while the display component is operating at the first brightness level, a fingerprint authentication triggering event. The fingerprint authentication triggering event may involve a physical interaction between a user and the display component. This physical interaction may involve a user touch on the display component.

In some embodiments, the computing device is configured to operate at a first brightness level or a second brightness level. For instance, the first brightness level may be 500 nits and the second brightness level may be 900 nits. Other brightness levels may also be used with the methods described herein. For example, based on ambient light conditions, the first brightness level may be 2 nits.

Block 720 includes determining, based on the fingerprint authentication triggering event, a first portion of the graphical user interface to operate at the second brightness level.

Block 730 includes transitioning, in response to the fingerprint authentication triggering event, the display component from the first brightness level to the second brightness level.

Block 740 includes displaying a second portion of the display component based on applying, to the second portion, one of: (1) the first brightness level, or (2) a value offset to a gray level for the second brightness level.

After transitioning the display component from the first brightness level to the second brightness level, some embodiments include detecting that the fingerprint authentication triggering event has ended. In response to detecting that the fingerprint authentication triggering event has ended, these embodiments include transitioning the display component from the second brightness level to the first brightness level. Some of these embodiments include detecting that the fingerprint authentication triggering event has ended by determining that a fingerprint detection has been performed. Some of these embodiments include detecting that the fingerprint authentication triggering event has ended by determining that a threshold time to perform a fingerprint detection has expired.

Some embodiments include determining a first luminance value of the display component at the first brightness level. The value offset to the gray level for the second brightness level may be based on the first luminance value.

Some embodiments include determining, for a gamma value, a pair of gamma curves corresponding to the first brightness level and the second brightness level. The value offset may be determined based on the pair of gamma curves. In some embodiments, the device may be configured with multiple gamma values, and multiple pairs of gamma curves.

Some embodiments include applying, to the second portion, the first brightness level, by applying a virtual layer over the second portion. The virtual layer may have a specified level of transparency. Some of these embodiments include determining a first luminance value of the display component at the first brightness level. Then, these embodiments include determining a second luminance value of the display component at the second brightness level. The specified level of transparency may correspond to a ratio of the first luminance value to the second luminance value. In some embodiments, the specified level of transparency may correspond to a range of possible values. In some of these embodiments, the specified level of transparency may be input by a user, and the embodiments include providing, via the display component, a transparency adjustment bar to receive the input by the user of a preferred level of transparency. In response to detecting that the fingerprint authentication triggering event has ended, some embodiments include removing the virtual layer.

Some embodiments include determining, for the second portion of the display component, a group of pixels. Further, these embodiments include determining, for the group of pixels, the first luminance value at the first brightness level.

In some embodiments, the second brightness level is greater than the first brightness level. In some embodiments, the first brightness level ranges from 0 to 500 nits. In some embodiments, the second brightness level ranges from 600 to 900 nits.

Some embodiments include determining the first brightness level based on an environmental state measurement associated with an environment around the device. In some embodiments, an ambient light sensor is configured to receive ambient light measurements from the environment around the device. The environmental state measurement includes a current ambient light measurement received by the ambient light sensor from the environment around the device.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device comprising:
 a display component, wherein the display component is configured to operate at a first brightness level or a second brightness level; and
 one or more processors operable to perform operations, the operations comprising:
  detecting, via a graphical user interface displayed by the display component and while the display component is operating at the first brightness level, a fingerprint authentication triggering event;
  determining, based on the fingerprint authentication triggering event, a first portion of the graphical user interface to operate at the second brightness level;
  transitioning, in response to the fingerprint authentication triggering event, the display component from the first brightness level to the second brightness level; and
  while displaying the first portion of the display component at the second brightness level, displaying a second portion of the display component at the first brightness level by applying a semi-transparent virtual layer over the second portion.

2. The device of claim 1, the operations further comprising:
after transitioning the display component from the first brightness level to the second brightness level, detecting that the fingerprint authentication triggering event has ended; and
in response to detecting that the fingerprint authentication triggering event has ended, transitioning the display component from the second brightness level to the first brightness level.

3. The device of claim 2, the operations further comprising:
detecting that the fingerprint authentication triggering event has ended by determining that a fingerprint detection has been performed.

4. The device of claim 2, the operations further comprising:
detecting that the fingerprint authentication triggering event has ended by determining that a threshold time to perform a fingerprint detection has expired.

5. The device of claim 1, the operations further comprising:
determining a first luminance value of the display component at the first brightness level,
determining a value offset to a gray level for the second brightness level based on the first luminance value; and
applying the value offset to the gray level for the second brightness level.

6. The device of claim 1, the operations further comprising:
determining, for a gamma value, a pair of gamma curves corresponding to the first brightness level and the second brightness level,
determining a value offset to a gray level for the second brightness level based on the pair of gamma curves; and
applying the value offset to the gray level for the second brightness level.

7. The device of claim 6, wherein the device is configured with multiple gamma values, and multiple pairs of gamma curves.

8. The device of claim 1,
wherein the semi-transparent virtual layer has a specified level of transparency.

9. The device of claim 8, the operations further comprising:
determining a first luminance value of the display component at the first brightness level;
determining a second luminance value of the display component at the second brightness level, and
wherein the specified level of transparency corresponds to a ratio of the first luminance value to the second luminance value.

10. The device of claim 8, wherein the specified level of transparency corresponds to a range of possible values.

11. The device of claim 8, wherein the specified level of transparency is input by a user, and the operations further comprising:
providing, via the display component, a transparency adjustment bar to receive the input by the user of a preferred level of transparency.

12. The device of claim 8, the operations further comprising:
in response to detecting that the fingerprint authentication triggering event has ended, removing the virtual layer.

13. The device of claim 1, the operations further comprising:
determining, for the second portion of the display component, a group of pixels; and
determining, for the group of pixels, a first luminance value at the first brightness level.

14. The device of claim 1, the operations further comprising:
determining, for each pixel in the second portion of the display component, a first luminance value at the first brightness level.

15. The device of claim 1, wherein the second brightness level is greater than the first brightness level.

16. The device of claim 1, wherein the first brightness level ranges from 0 to 500 nits.

17. The device of claim 1, the operations further comprising:
determining the first brightness level based on an environmental state measurement associated with an environment around the device.

18. The device of claim 1, wherein the operations for displaying the second portion further comprise:
applying a value offset to a gray level for the second brightness level, wherein the applying of the value offset comprises identifying a second gray level corresponding to the gray level, wherein a first luminance value of the display component at the second brightness level for the gray level substantially matches a second luminance value of the display component at the first brightness level for the second gray level.

19. The device of claim 17, further comprising an ambient light sensor configured to receive ambient light measurements from the environment around the device, wherein the environmental state measurement comprises a current ambient light measurement received by the ambient light sensor from the environment around the device.

20. A computer-implemented method comprising:
detecting, via a graphical user interface displayed by a display component and while the display component is operating at a first brightness level, a fingerprint authentication triggering event, wherein the display component is configured to operate at the first brightness level or a second brightness level;
determining, based on the fingerprint authentication triggering event, a first portion of the graphical user interface to operate at the second brightness level;
transitioning, in response to the fingerprint authentication triggering event, the display component from the first brightness level to the second brightness level; and
while displaying the first portion of the display component at the second brightness level, displaying a second portion of the display component at the first brightness level by applying a semi-transparent virtual layer over the second portion.

21. An article of manufacture including a non-transitory computer-readable medium, having stored thereon program instructions that, upon execution by one or more processors of a computing device, cause the computing device to carry out operations comprising:
detecting, via a graphical user interface displayed by a display component and while the display component is operating at a first brightness level, a fingerprint authentication triggering event, wherein the display component is configured to operate at the first brightness level or a second brightness level;
determining, based on the fingerprint authentication triggering event, a first portion of the graphical user interface to operate at the second brightness level;

transitioning, in response to the fingerprint authentication triggering event, the display component from the first brightness level to the second brightness level; and while displaying the first portion of the display component at the second brightness level, displaying a second portion of the display component at the first brightness level by applying a semi-transparent virtual layer over the second portion.

\* \* \* \* \*